(12) United States Patent
Kishizoe

(10) Patent No.: US 11,872,849 B2
(45) Date of Patent: Jan. 16, 2024

(54) STUD PIN AND STUD TIRE

(71) Applicant: The Yokohama Rubber Co., LTD., Tokyo (JP)

(72) Inventor: Isamu Kishizoe, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 390 days.

(21) Appl. No.: 17/050,402

(22) PCT Filed: Apr. 22, 2019

(86) PCT No.: PCT/JP2019/016915
§ 371 (c)(1),
(2) Date: Oct. 23, 2020

(87) PCT Pub. No.: WO2019/208459
PCT Pub. Date: Oct. 31, 2019

(65) Prior Publication Data
US 2021/0070108 A1 Mar. 11, 2021

(30) Foreign Application Priority Data
Apr. 25, 2018 (JP) ................................. 2018-084310

(51) Int. Cl.
*B60C 11/16* (2006.01)
(52) U.S. Cl.
CPC ...... *B60C 11/1643* (2013.01); *B60C 11/1656* (2013.01); *B60C 11/1625* (2013.01)
(58) Field of Classification Search
CPC ............. B60C 11/1643; B60C 11/1625; B60C 11/1656
(Continued)

(56) References Cited

U.S. PATENT DOCUMENTS

D811,323 S *  2/2018  Mori ........................... D12/604
2004/0163746 A1* 8/2004  Eromaki ................ B29D 30/66
                                                    156/114
(Continued)

FOREIGN PATENT DOCUMENTS

FI           123780 B  * 10/2013
KR    10-2015-0071293     6/2015
(Continued)

OTHER PUBLICATIONS

Machine translation for WO 99/56976 (Year: 2022).*
(Continued)

*Primary Examiner* — Steven D Maki
(74) *Attorney, Agent, or Firm* — Thorpe North & Western

(57) ABSTRACT

In a stud pin, a flange contour shape of a lower flange is an anisotropic shape in which, among imaginary rectangles circumscribing the contour shape, the smallest rectangle includes short sides and long sides having different lengths. The flange contour shape includes first recess portions on each of portions of the flange contour shape extending along the short sides, the first recess portions being curved toward a centroid of the flange contour shape, and the flange contour shape includes a second recess portion on portions of the flange contour shape extending along the long sides, the second recess portions being curved toward the centroid of the flange contour shape. A body contour shape of a body portion is a polygonal shape including vertex angles in a same number as the first and second recess portions, and the vertex angles are disposed facing the first and second recess portions.

13 Claims, 7 Drawing Sheets

(58) Field of Classification Search
USPC .......................................................... D12/608
See application file for complete search history.

(56) References Cited

U.S. PATENT DOCUMENTS

| | | | |
|---|---|---|---|
| 2013/0000807 A1 | 1/2013 | Pons et al. | |
| 2016/0046156 A1 | 2/2016 | Matsumoto | |
| 2017/0349006 A1 | 12/2017 | Matsumoto | |
| 2017/0368889 A1* | 12/2017 | Ajoviita | ................. B60C 11/16 |
| 2018/0319220 A1 | 11/2018 | Matsumoto | |

FOREIGN PATENT DOCUMENTS

| | | |
|---|---|---|
| WO | WO-99/56976 A1 * | 11/1999 |
| WO | WO 2014/027145 | 2/2014 |
| WO | WO 2015/114813 | 8/2015 |
| WO | WO 2016/098394 | 6/2016 |
| WO | WO 2017/081873 | 5/2017 |

OTHER PUBLICATIONS

Machine translation for Finland 123780 (Year: 2023).*
International Search Report for International Application No. PCT/JP2019/016915 dated Jul. 16, 2019, 3 pages, Japan.

* cited by examiner

STUD PIN AND STUD TIRE

TECHNICAL FIELD

The present technology relates to a stud pin installed in a tire and a studded tire.

BACKGROUND ART

In the related art, studded tires for use on icy and snowy roads include stud pins installed in a tread portion and provide grip on icy road surface.

Typically, a stud pin is inserted in a pin inserting hole (hereinafter, also referred to as simply "hole") provided in the tread portion. In a case where a stud pin is inserted into a hole, the stud pin is introduced into the hole in a state in which the pin bore is expanded, thus firmly fastened in the hole and the tread portion, and installed in the tread portion. Thus, the stud pin is prevented from falling out from the hole due to a breaking or accelerating force or a lateral force received from the road surface during rolling of the studded tire.

In a case where the stud pin falls out from the studded tire, the stud pin falls out while rotating with respect to the hole. Thus, to be prevented from falling out, the stud pin is preferably inhibited from rotating with respect to the hole. As such, in many technologies, the contour shape of an upper flange or a lower flange of the stud pin has been given a non-arc shape.

For example, a known stud pin includes a lower flange with a contour shape that includes protrusion portions projecting in an arc shape in opposite directions and curved portions recessed in an arc shape in an orthogonal direction orthogonal to the projection direction of the protrusion portions, wherein the stud pin is anisotropic in that the length of the contour shape in the projection direction of the protrusion portion is longer than the length of the contour shape in the orthogonal direction. (International Patent Publication No. WO 2014/027145)

The stud pin in which the upper flange or the lower flange has a non-arc contour shape can suppress falling out of the stud pin.

Because of anisotropy of the stud pin, the stud pin needs to be oriented with respect to the tire before being implanted into the hole. The implantation of stud pins is typically performed using a stud pin installation device including installing fingers. However, appropriately stabilizing the orientation of such stud pins is difficult in a case where the stud pins are gripped by the installing fingers, and mistakes in implantation are likely to occur. This reduces the productivity of the studded tire.

SUMMARY

The present technology provides a stud pin that does not easily fall out from a pin inserting hole in a studded tire and that can be very easily implanted, and a studded tire equipped with the stud pins.

One aspect of the present technology is a stud pin installable in a tire.

A stud pin installable in a tire, including a tip including an end surface that comes into contact with a road surface, a body portion holding the tip with the tip projecting from an end portion of one side of the body portion, and a lower flange connected to an end portion of the other side of the body portion opposite to the end portion of the one side of the body portion. A flange contour shape of the lower flange as viewed in an arrangement direction of the tip, the body portion, and the lower flange has an anisotropic shape in which, among imaginary rectangles circumscribing a first flange contour shape, at least one smallest rectangle of a first smallest rectangle having the shortest side of four sides being smallest among the rectangles or a second smallest rectangle having the longest side of four sides being smallest among the rectangles includes short sides and long sides having different lengths, the flange contour shape includes two or more first recess portions provided on each of portions of the flange contour shape extending along the short sides, the first recess portions being curved toward a centroid of the flange contour shape, the flange contour shape includes a second recess portion provided on each of portions of the flange contour shape extending along the long sides, the second recess portion being curved toward the centroid of the flange contour shape, a body contour shape of the body portion as viewed in the arrangement direction is a polygonal shape including a plurality of vertex angles, the number of the vertex angles is identical to the total number of the first recess portions and the second recess portions, and the vertex angles are disposed respectively facing the first recess portions and the second recess portions.

The flange contour shape is, in other words, the at least one of the smallest rectangles described above, and is the anisotropic shape described above.

The body contour shape is located inward of the flange contour shape.

Preferably, the flange contour shape further includes a first protrusion portion provided on each of the portions of the flange contour shape extending along the short sides and interposed between the first recess portions adjacent to each other, the first protrusion portion projecting away from the centroid of the flange contour shape.

Preferably, in a portion of the body contour shape between the vertex angles adjacent to each other along an outer circumference of the body contour shape, a distance L1 between the first protrusion portion and a portion facing the first protrusion portion along an orthogonal direction to the arrangement direction is longer than a distance L2 between the second recess portion and one of the vertex angles facing the second recess portion along the orthogonal direction.

Preferably, the first protrusion portion projects toward a center of one of two of the short sides of the at least one of the smallest rectangles, the short side being located on the same side as that on which the first protrusion portion is located, with respect to the centroid of the flange contour shape.

Preferably, the flange contour shape further includes four second protrusion portions provided interposed between the first recess portion and the second recess portion adjacent to each other along an outer circumference of the flange contour shape, the second protrusion portions projecting away from the centroid of the flange contour shape.

Preferably, the first recess portion preferably extends along a direction inclined with respect to a lateral direction parallel to the short side.

Preferably, a ratio of a length of the long side of the smallest rectangle circumscribing the flange contour shape to a length of the short side of the smallest rectangle is greater than 1 and equal to or smaller than 1.5.

Preferably, the first recess portion has a first arc shape, portions of the flange contour shape located on both sides of the first recess portion along the outer circumference of the flange contour shape and connected to the first recess portion each have a second arc shape curved away from the centroid of the flange contour shape, and the arc of the first arc shape has a greater radius of curvature than the arc of the second arc shape.

Another aspect of the present technology is a studded tire installed with stud pins. The studded tire includes a tread portion installed with the stud pins such that a longitudinal direction of the flange contour shape parallel to the long sides faces a tire width direction.

According to the aspect described above, a stud pin that is unlikely to fall out from the pin inserting hole in the studded tire and that can be very easily implanted, and a studded tire including such stud pins.

DETAILED DESCRIPTION

Overall Description of Tire

Figure 1:
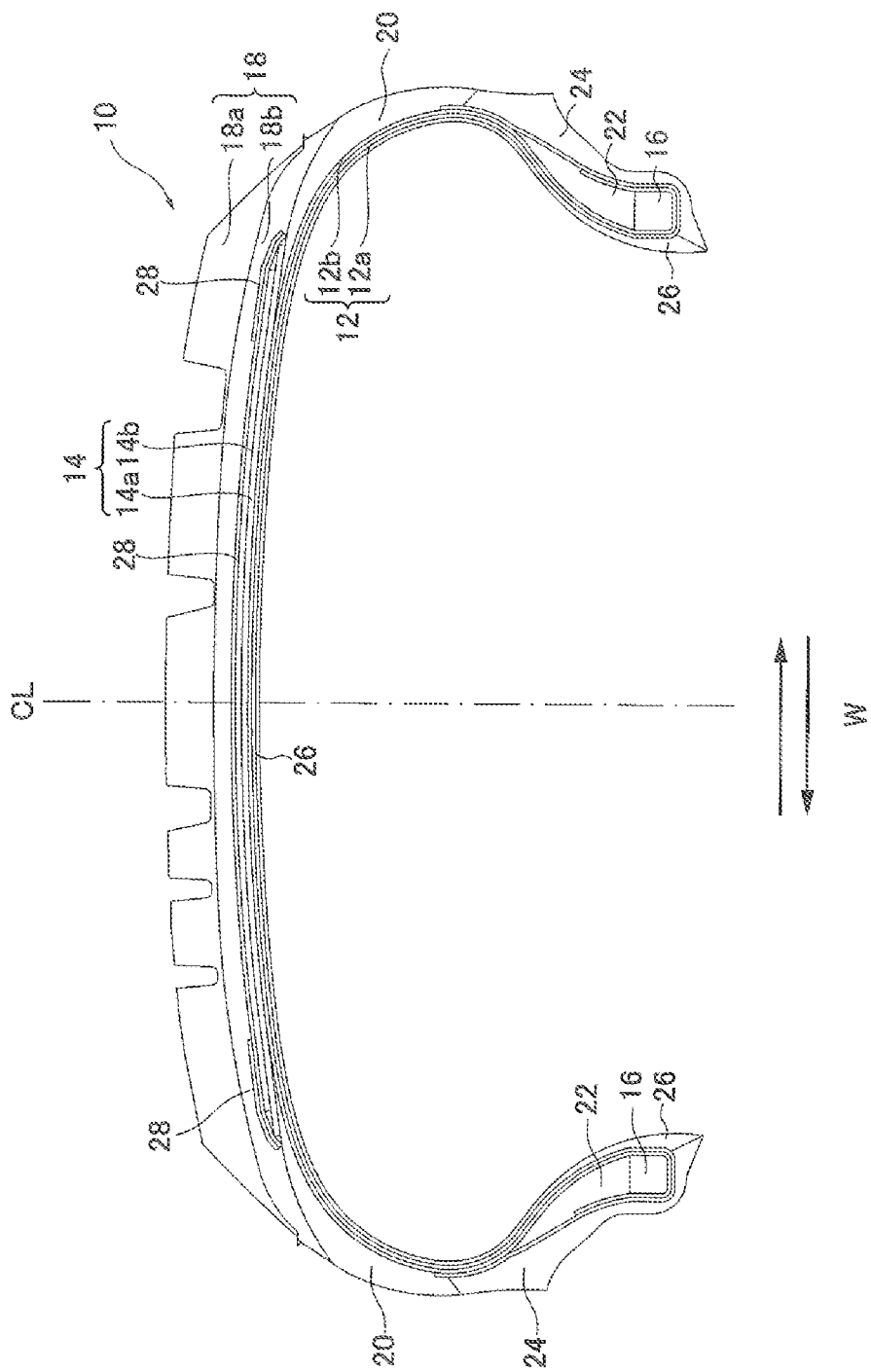
FIG. 1 is a tire cross-sectional view illustrating an example of a cross-section of a tire of the present embodiment.
Figure 2:
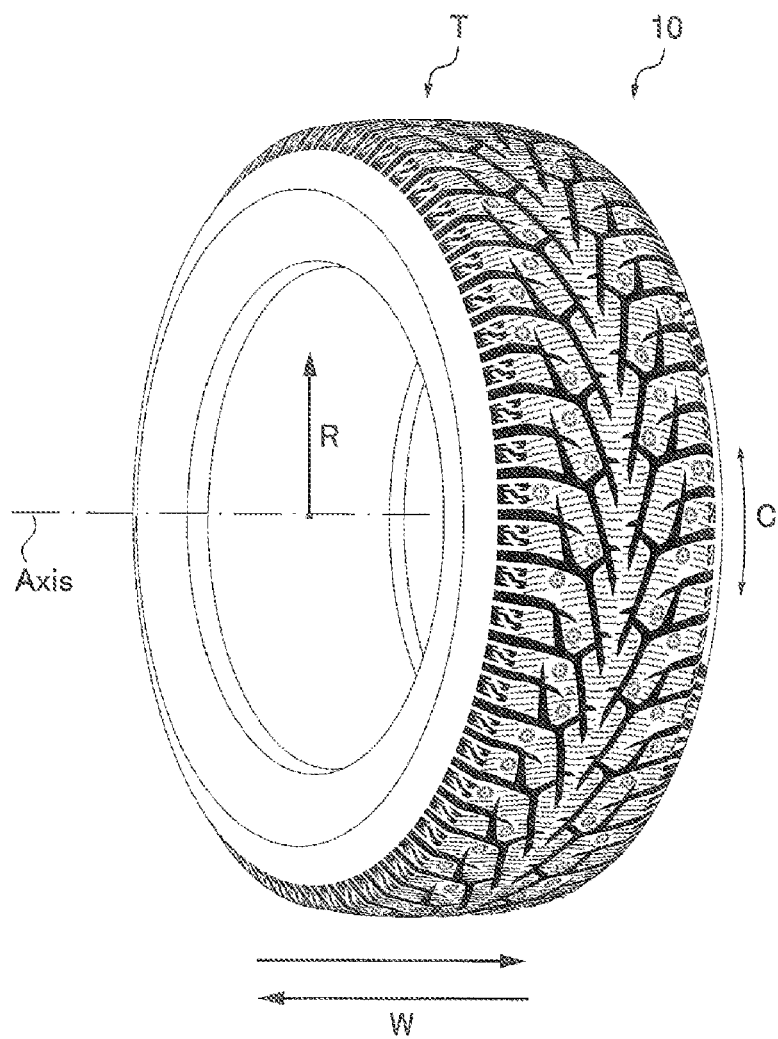
FIG. 2 is a perspective view of an example of the tire of the present embodiment.

Hereinafter, a studded tire of the present embodiment will be described. The present embodiment includes various embodiments described below. FIG. 1 is a tire cross-sectional view illustrating an example of a cross-section of a studded tire (hereinafter also referred to as "tire") 10 of the present embodiment. FIG. 2 is a perspective view of the tire 10.

The tire 10 is a tire with stud pins inserted into a tread portion (the stud pins are not illustrated in FIGS. 1 and 2).

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire can also be a small truck tire specified in Chapter B or a truck tire or bus tire specified in Chapter C.

Below, values of the dimensions of various pattern elements are described in detail as example values for a tire for a passenger vehicle. However, the studded tire is not limited to these example values.

"Tire circumferential direction C" described below (see FIG. 2) refers to the direction the tread surface rotates in a case where the tire 10 rotates around a tire rotation axis Axis (see FIG. 2). "Tire radial direction R" refers to the direction that extends radially orthogonal to the tire rotation axis Axis. "Outward in the tire radial direction" refers to the direction away from the tire rotation axis Axis in the tire radial direction R. "Tire width direction W" refers to the direction parallel with the tire rotation axis Axis. "Outward in the tire width direction" refers to both directions away from a tire equator line CL (see FIG. 3) of the tire 10.

Tire Structure

The tire 10 includes a carcass ply 12, a belt 14, and bead cores 16 as framework members. The tire 10 also mainly includes a tread rubber 18, side rubbers 20, bead filler rubbers 22, rim cushion rubbers 24, and an inner liner rubber 26 around the framework members.

The carcass ply 12 includes carcass ply members 12a and 12b that are formed from organic fibers covered with rubber and that are wound between the pair of bead cores 16 of an annular shape so as to be formed into a toroidal shape. In the tire 10 illustrated in FIG. 1, the carcass ply 12 is made of the carcass ply members 12a and 12b, but may also be made of a single carcass ply member. The belt 14 is provided outward of the carcass ply 12 in the tire radial direction and is constituted of two belt members 14a and 14b. The belt 14 is a member formed from steel cords covered with rubber, the steel cords being arranged inclined at a predetermined angle, for example, 20 to 30 degrees, with respect to the tire circumferential direction C. The width in the tire width direction of the belt member 14a that is a lower layer is greater than the width of the belt member 14b that is the upper layer. The steel cords of the two layers of the belt members 14a and 14b are inclined from the tire circumferential direction C toward the tire width direction W in mutually different directions. As such, the belt members 14a and 14b are crossing layers serving to suppress expansion of the carcass ply 12 due to the pressure of the air in the tire.

The tread rubber 18 is disposed outward of the belt 14 in the tire radial direction. Both end portions of the tread rubber 18 connect to the side rubbers 20 to form sidewall portions. The tread rubber 18 is made of two layers of rubber, namely an upper layer tread rubber 18a provided on the outer side in the tire radial direction and a lower layer tread rubber 18b provided on the inner side in the tire radial direction. The rim cushion rubbers 24 are provided at the ends of the side rubbers 20 on the inner side in the tire radial direction, and come into contact with the rim on which the tire 10 is mounted. The bead filler rubbers 22 are provided outward of the bead cores 16 in the tire radial direction so as to be interposed between a portion of the carcass ply 12 before where it is wound around the bead cores 16 and a portion of the carcass ply 12 after where it is wound around the bead cores 16. The innerliner rubber 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt 14 from the outer side in the tire radial direction of the belt 14.

The tire 10 has such a tire structure, but the tire structure of the present embodiment is not limited to the tire structure illustrated in FIG. 1.

Tread Pattern

Figure 3:
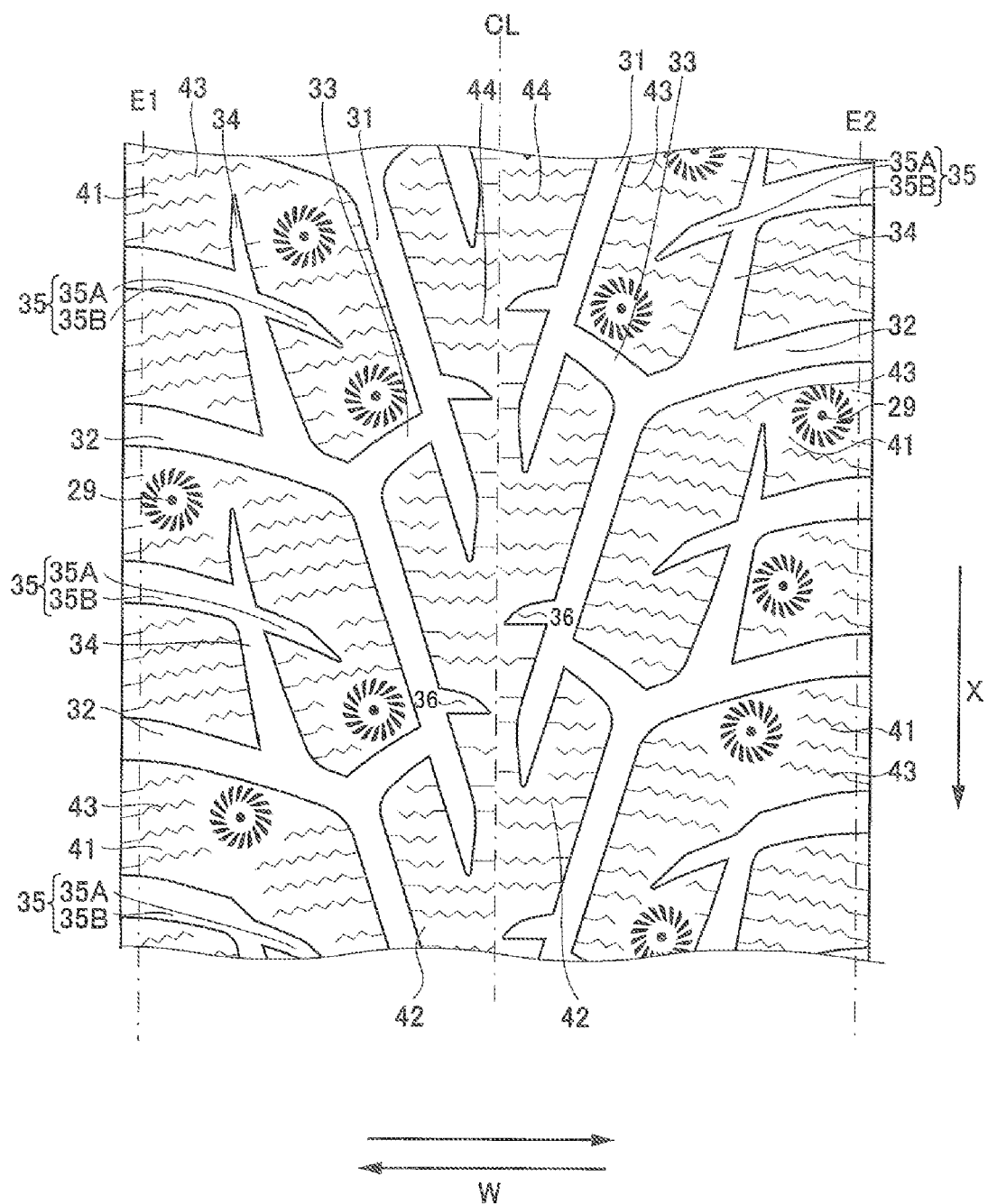
FIG. 3 is a developed plan view of a part of a tread pattern, illustrating an example of a tread pattern of a studded tire of the present embodiment developed on a plane.

FIG. 3 is a developed plan view illustrating a part of a tread pattern of a tread pattern 30 of the tire 10 developed on a plane. Note that the tread pattern employed in the tire 10 is not limited to the tread pattern 30. Stud pins (see FIGS. 4A and 4B) are installed in pin inserting holes 29 described below.

As illustrated in FIG. 3, the tire 10 has a designated rotation direction X indicating a one-way orientation along the tire circumferential direction C. The orientation of the rotation direction X is displayed and designated by numbers, symbols, and the like provided on the sidewall surface of the tire 10.

The tread pattern 30 includes a plurality of first inclined grooves 31, a plurality of first lug grooves 32, a plurality of second inclined grooves 33, a plurality of third inclined grooves 34, second lug grooves 35, and projecting grooves 36.

The first inclined grooves 31 are provided in plurality in the tire circumferential direction. Each of the first inclined grooves 31 includes a starting end located away from the centerline CL, extends from the starting end in a direction opposite to the tire rotation direction X, and extends inclined outward in the tire width direction.

The first lug grooves 32 are provided in plurality in the tire circumferential direction. Each of the first lug grooves 32 extends from a tire width direction outer end portion of the first inclined groove 31 in the direction opposite to the tire rotation direction X and extends inclined outward in the tire width direction and outward beyond ground contact edges E1 and E2 in the tire width direction.

The ground contact edges E1 and E2 refer to ends, in the tire width direction W, of a ground contact surface formed on a flat plate in a case where the tire is mounted on a specified rim, inflated to a specified internal pressure, for example, an internal pressure of 200 kPa, and vertically loaded with 88% of a specified load. Herein, "specified rim" refers to a "Measuring Rim" defined by the ETRTO (The European Tyre and Rim Technical Organisation) (2011 version), "applicable rim" defined by JATMA, or "Design Rim" defined by TRA (The Tire and Rim Association, Inc.). Additionally, "specified internal pressure" refers to "INFLATION PRESSURES" defined by ETRTO, a "maximum air pressure" defined by JATMA, or the maximum value in "TIRE LOAD LIMITS AT VARIOUS COLD INFLATION PRESSURES" defined by TRA. "Regular load" refers to "LOAD CAPACITY" defined by ETRTO, a "maximum load capacity" defined by JATMA, or the maximum value in "TIRE LOAD LIMITS AT VARIOUS COLD INFLATION PRESSURES" defined by TRA.

The second inclined grooves 33 are provided in plurality in the tire circumferential direction. Each of the second inclined grooves 33 extends from a tire width direction outer end portion of the corresponding first inclined groove 31 in the direction opposite to the tire rotation direction X and extends inclined inward in the tire width direction to adjacent, another first inclined groove 31.

The third inclined grooves 34 are provided in plurality in the tire circumferential direction. Each of the third inclined grooves 34 extends from the middle of the corresponding first lug groove 32 in the direction opposite to the tire rotation direction X and extends inclined outward in the tire width direction. The third inclined grooves 34 have a shape in which the groove width gradually narrows towards the outer side in the tire width direction and gradually widens towards the inner side in the tire width direction.

The second lug grooves 35 extend between two of the first lug grooves 32 located adjacent to each other in the tire circumferential direction aligned with the first lug grooves 32 without crossing with the first inclined grooves 31 and the second inclined grooves 33.

The third inclined grooves 34 extend through the second lug grooves 35. The width of portions 35A of the second lug grooves 35 on the inner side in the tire width direction of the crossing sections with the third inclined grooves 34 is narrower than the width of portions 35B on the outer side in the tire width direction of the crossing sections with the third inclined grooves 34.

The projecting groove 36 projects inward from the middle of the corresponding first inclined groove 31 in the tire width direction.

Sipes 43 are provided in the land portions 41 enclosed by the first inclined grooves 31, the first lug grooves 32, the second inclined grooves 33, and the tread ground contact edges E1 and E2. Also, sipes 44 are provided in land portions 42 on the inner side in the tire width direction of the first inclined grooves 31 and the second inclined grooves 33. The sipes 44 extend substantially parallel with the tire width direction. The sipes 43 are inclined with respect to an extension direction of the sipes 44. The sipes 43 inclined with respect to the sipes 44 allow turning performance of the tire 10 to be improved.

As illustrated in FIG. 3, stud pin inserting holes 29 are provided in the land portions 41 enclosed by the first inclined grooves 31, the first lug grooves 32, the second inclined grooves 33, and the ground contact edges E1 and E2, as illustrated in FIG. 3. With stud pins 50, described below, installed in the stud pin inserting holes 29, the tire 10 functions as a studded tire, with performance on ice such as braking on ice or turning on ice improved.

Stud Pin

Figure 4A:
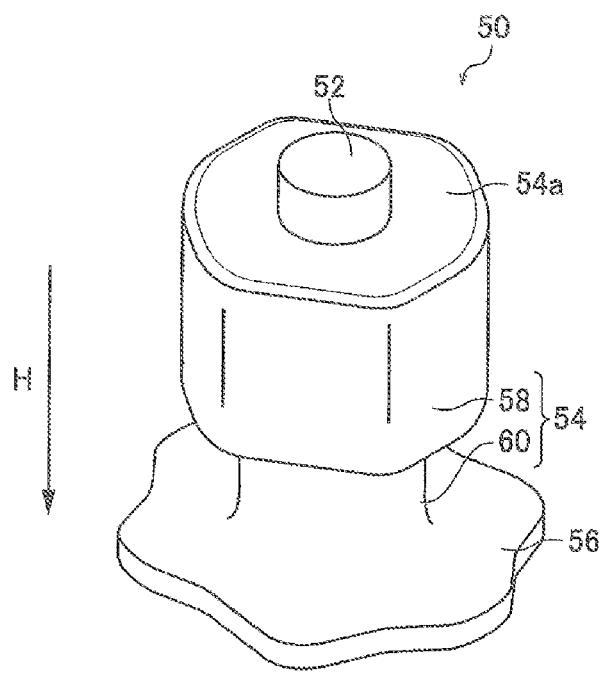
FIGS. 4A and 4B respectively are a perspective view and a plan view of an example of a stud pin of the present embodiment.
Figure 4B:
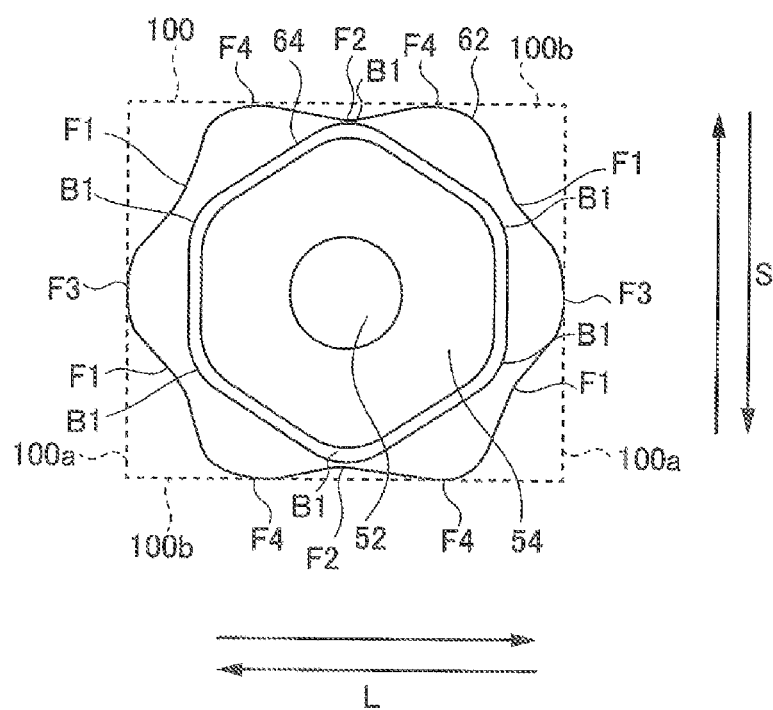

FIGS. 4A and 4B respectively are a perspective view and a plan view of a stud pin 50 of the present embodiment. Note that the present embodiment includes various embodiments described below.

The stud pin 50 includes a tip 52, a body portion 54, and a lower flange 56. The body portion 54 includes an upper flange 58 and a shank portion 60. In a case where installed in the pin inserting holes 29 of the tire 10, the body portion 54 and the lower flange 56 are inserted into the tread rubber 18 (see FIG. 1) and are in contact with the tread rubber 18.

The tip 52 includes a tip end surface that comes into contact with a road surface. The tip 52 is formed from tungsten carbide or a similar hard metal. According to an embodiment, the tip 52 may be formed from a cermet material. The tip 52 is fixed in a hole provided in an upper end surface 54a of the body portion 54. The tip 52 of the stud pin 50 protrudes from the tread surface in a case where the stud pin 50 is installed in the tire 10.

The body portion 54 is a portion that supports the tip 52 with the tip 52 projecting from the upper end surface 54a on one side. The body portion 54 extends in the direction opposite to the projection direction of the tip 52. The extension direction of the body portion 54 is also the direction in which the tip 52, the body portion 54, and the lower flange 56 are arranged, and this direction is referred to as the H-direction.

The upper flange 58 of the body portion 54 is formed so that, in a case where inserted into the tread portion of the tire 10, the tip 52 protrudes from the tread surface. The tip 52 is fixed on upper end surface 54a of the body portion 54.

The lower flange 56 is formed to come into contact with a bottom of the pin inserting hole 29, in a case where inserted into the tread portion of the tire 10. The lower flange 56 is connected to the end of the shank portion 60 on the opposite side of the upper end surface 54a of the body portion 54.

The shank portion 60 is a portion that connects the upper flange 58 and the lower flange 56. The cross section of the shank portion 60 in the direction orthogonal to the H-direction is thinner than the cross sections of the upper flange 58 and the lower flange 56.

The material of the body portion 54 and the lower flange 56 is not particularly limited, but is preferably different from the material of the tip 52. According to an embodiment, the body portion 54 and the lower flange 56 are formed from aluminum alloy or the like in order to reduce the weight of the stud pin 50.

A flange contour shape 62 of the lower flange 56 is an anisotropic shape in a case where the lower flange 56 is viewed in the direction H from the opposite side of direction H. Here, as illustrated in FIG. 4B, the anisotropic shape is a shape in which, among imaginary rectangles circumscribing the flange contour shape 62 and inclined in various directions, at least one smallest rectangle of a first smallest rectangle having the shortest side of its four sides being smallest among the rectangles or a second smallest rectangle having the longest side of its four sides being smallest among the rectangles includes short sides and long sides having different lengths. In FIG. 4B, a first smallest rectangle 100 is illustrated. In this example, the first smallest rectangle 100 includes a side 100a corresponding to the shortest of the shortest sides. The first smallest rectangle 100 also corresponds to the second smallest rectangle. In other words, the second smallest rectangle includes a side 100b corresponding to the shortest of the longest sides. The side 100a of the sides of the first smallest rectangle 100, which is also the second smallest rectangle, is a short side, and the side 100b is a long side. Accordingly, the flange contour shape 62 of the lower flange 56 is an anisotropic shape. Hereinafter, the side 100b is referred to as "long side 100b", and the side 100a is referred to as "short side 100a".

Figure 5:
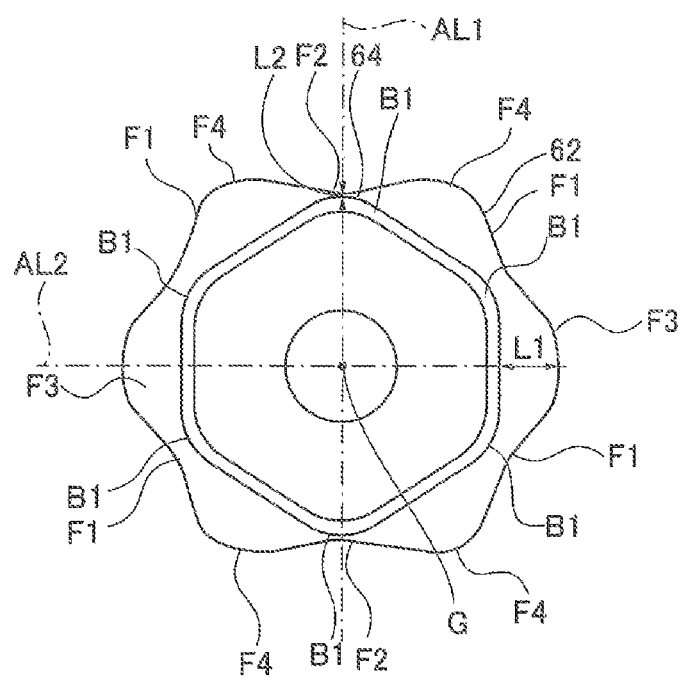
FIG. 5 is a diagram illustrating contour shapes of a lower flange and a body portion according to one embodiment.

FIG. 5 is a diagram illustrating the flange contour shape 62 and the body contour shape 64 according to an embodiment.

The flange contour shape 62 of the lower flange 56 with the anisotropic shape includes two or more first recess portions F1 located in respective portions of the flange contour shape 62 extending along the short side 100a (hereinafter referred to as the short side portions), the recess portions F1 being curved toward the centroid G of the flange contour shape 62. The short side portion is a portion of the flange contour shape 62 extending along the lateral direction S parallel to the short side 100a, and refers to a portion where the inclination angle of a tangent line at a position on the outer circumference of the flange contour shape 62 with respect to the lateral direction S is 45 degrees or less. The short side portion is located on both sides of the lower flange 56 (left and right sides in FIG. 4B) across the centroid G.

In the example illustrated in FIG. 4B, two of the first recess portions F1 are provided for each short side portion, but three or more of the short side portions may be provided for each short side portion, and the number of the first recess portions F1 may be different between the opposite short side portions.

In addition, the flange contour shape 62 includes second recess portions F2 located in in respective portions of the flange contour shape extending along the long sides 100b (hereinafter referred to as the long side portions), the second recess portions F2 being curved and recessed toward the centroid G of the flange contour shape 62. The long side portion is a portion of the flange contour shape 62 extending along the longitudinal direction L parallel to the long sides 100b, and refers to a portion where the inclination angle of a tangent line at a position on the outer circumference of the flange contour shape 62 with respect to the longitudinal direction L is less than 45 degrees. The long side portion is located on both sides of the lower flange 56 (both the upper and lower sides of FIG. 4B) across the centroid G.

The boundary between the short side portion and the long side portion on the outer circumference of the flange contour shape 62 is located on the outer circumference of a portion (the second protrusion portion F4 in the example illustrated in FIG. 4B) between the first recess portion F1 and the second recess portion F2 adjacent to each other along the outer circumference of the flange contour shape 62.

With the flange contour shape 62 provided with the above-described first recess portion F1 and second recess portion F2, the lower flange 56 is easily gripped by the installing fingers of the stud pin installation device used in a case where the stud pin 50 is inserted in the pin inserting hole 29.

Figure 6A:
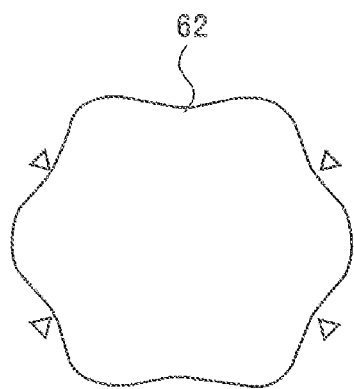
FIGS. 6A to 6C are diagrams illustrating examples of gripping positions of installing fingers of a stud pin installation device gripping a lower flange with a contour shape illustrated in FIG. 5.
Figure 6B:
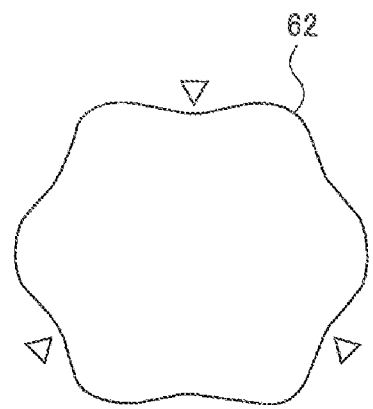
Figure 6C:
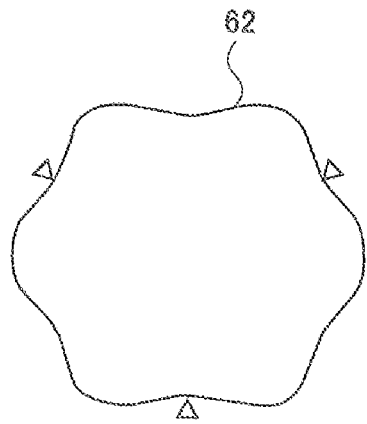

FIGS. 6A to 6C are diagrams illustrating examples of gripping positions of the installing fingers of the stud pin installation device where the lower flange 56 with the flange contour shape 62 illustrated in FIG. 5 is gripped.

FIGS. 6A to 6C illustrate that the installing fingers grip the lower flange 56 at the positions marked with "Δ". FIG. 6A illustrates an example with four installing fingers. FIGS. 6B and 6C illustrate an example with three installing fingers. In the examples illustrated in FIGS. 6A to 6C, all the gripping positions are located at the recess portions. In this manner, regardless of whether the number of the installing fingers is three or four, the installing fingers grip the stud pin 50 at the positions of the recess portions of the lower flange 56. Thus, regardless of the type of installing fingers, the stud pin 50 can be stably gripped and inserted into the pin inserting hole 29.

The recess depth of the first recess portion F1 may be greater than, less than, or equal to the recess depth of the second recess portion F2. However, according to one embodiment, the recess depth of the first recess portion F1 is preferably greater than the recess depth of the second recess portion F2. Thus, the distances between the centroid and each of the gripping positions where the plurality of installing fingers grip the lower flange 56 are closer to an equal length each other, and the posture of the stud pin 50 gripped by the installing fingers is more easily stabilized. "Recess depth" refers to a recess depth toward the centroid of the flange contour shape 62 with reference to a line segment connecting the vertexes of the protrusion portions on both sides of the recess portion (the vertexes correspond to positions furthest away from the centroid).

Additionally, according to the present embodiment, the body contour shape 64 of the upper flange 58 as viewed in the direction H from the opposite side of the direction H is a polygonal shape including a plurality of vertex angles B1 the number of which is identical to the total number of the first recess portions F1 and the second recess portions F2. In the example illustrated in FIG. 4B, the body contour shape 64 has a hexagonal shape including six vertex angles B1 that are the same as the number of the total of the first recess portion F1 and the second recess portion F2.

In the stud pin 50 of the present embodiment, the lower flange 56 has an anisotropic shape in which the flange contour shape 62 includes two or more first recess portions F1 in each of the short side portions, and a second recess portion F2 in each of the long side portions, and the upper flange 58 has an anisotropic shape in which the body contour shape 64 has a polygonal shape. Thus, as described below, rotation of the stud pin 50, which corresponds to an initial factor of falling out of the stud pin 50 from the pin inserting hole 29, is suppressed, making the stud pin 50 unlikely to fall out from the pin inserting hole 29. In other words, pin drop resistance is greatly increased.

As described above, before falling out from the pin inserting hole, the stud pin rotates in the pin inserting hole. Typically, in a case of receiving shear force from an icy road surface, the stud pin inclines so as to tumble against the pin inserting hole in which it is installed. This reduces the fastening force on the stud pin from the hole. In this way, the stud pin can easily rotate around the center axis in the pin inserting hole. Furthermore, in a case where the stud pin receives a shear force from an icy road surface, the reduced fastening force of the pin inserting hole facilitates rotation of the stud pin around the center axis. This reduces the resistance of tread rubber acting to hold the stud pin in the pin inserting hole, making the stud pin more likely to fall out from the pin inserting hole.

However, the body contour shape 64 of the stud pin 50 is the polygonal shape including the plurality of vertex angles B1, and the flange contour shape 62 includes the plurality of recess portions F1 and F2, that is, the upper flange 58 and the lower flange 56 include a plurality of recesses (including portions of the upper flange 58 each between the adjacent vertical angles. The same applies hereinafter) and a plurality of protrusions, and thus has a greater periphery length than a circular lower flange having the same area as that of the lower flange 56. Because the tread rubber 18 deformed in association with the recesses and protrusions firmly fasten the stud pin 50 into the pin inserting hole 29, the stud pin 50 is less significantly inclined in a case of being subjected to a shear force from the icy road surface, suppressing tumbling. Thus, a gap is less likely to be formed between the stud pin 50 and the pin inserting hole 29, and the tread rubber 18 (inner wall surface of the pin inserting hole 29) keeps firmly fastening of the body portion 54 and the lower flange 56. Accordingly, the rotation of the stud pin 50 in the pin inserting holes 29, corresponding to an initial factor of falling out of the stud pin 50, can be suppressed. Thus, the stud pin 50 of the present embodiment can suppress the stud pin 50 from falling out greater than known stud pins including a lower flange with a contour shape that has a non-arc shape.

Furthermore, even if the stud pin 50 receives shear force from an icy road surface, a gap between the stud pin 50 and the pin inserting hole 29 is not easily formed, and the stud pin 50 is not easily moved out of position in the pin inserting hole 29 (does not come loose). Thus, the stud pin 50 does not easily fall out from the pin inserting hole 29, the shear force between the stud pin 50 and an icy road surface is efficiently transferred to the belt 14, to the entire studded tire 10, and to the vehicle mounted with the studded tire 10. Thus, the braking and driving properties and controllability on the icy road surface is improved.

The body contour shape 64 may be any other polygonal shape such as an octagonal shape, according to one example. Additionally, the body contour shape 64 is preferably a convex polygonal shape. In the example illustrated in FIG. 4B, the body contour shape is a convex hexagonal shape. According to one example, the body contour shape may be any other concave polygonal shape such as a convex octagonal shape. Note that in FIG. 5, the centroid of the flange contour shape 62 aligns with the centroid of the body contour shape 64. On the other hand, according to one embodiment, the body contour shape 64 preferably does not include a recess portion between two adjacent vertex angles that is curved and recessed toward the centroid of the body contour shape 64. The recess portion as used herein refers to a portion located closer to the centroid of the body contour shape 64 than a line segment connecting the vertexes of two adjacent vertex angles. Accordingly, the body contour shape 64 is preferably not a concave polygonal shape. A concave polygon refers to a polygon in which at least one vertex angle is greater than 180 degrees.

Additionally, a portion of the vertex angle B1 including a position furthest away from the centroid G may have a curved shape such as an arc shape, as in the example illustrated in FIG. 4B, and the vertex angle B1 may be bent and extend linearly from the position (vertex) furthest away from the centroid G on both sides along the body contour shape 64. However, according to one embodiment, this portion preferably has a bent shape such as an arc shape in that the upper flange 58 is easily assisted in a case where the installing fingers come into contact with the upper flange 58. On the other hand, the radius of curvature obtained in a case where the above-described portion has an arc shape is preferably set smaller than the radius of curvature of the circumscribing circle of the body contour shape 64 in order to improve the above-described effect improving braking and driving properties and controllability on the icy road surface by suppressing formation of a gap between the stud pin 50 and the pin inserting hole.

Furthermore, according to the present embodiment, the vertex angle B1 is provided facing each of the first recess portion F1 and the second recess portion F2. The vertex angle B1 facing the first recess portion F1 and the second recess portion F2 means that the orientation direction of the vertex angle B1 as viewed from the centroid G of the body contour shape 64 is located within an angular range in the orientation direction of a region on the outer circumference of the flange contour shape 62 in which the first recess portion F1 or the second recess portion F2 is located. Note that the region on the outer circumference of the flange contour shape 62 where the first recess portion F1 and the second recess portion F2 are located is defined as follows. In a case where the first recess portion F1 and the second recess portion F2 each have an arc shape or a shape obtained by combining a plurality of arcs, the region on the outer circumference of the flange contour shape 62 where the first recess portion F1 and the second recess portion F2 are located corresponds to the region of the flange contour shape 62 located between opposite boundaries where the center of the radius of curvature shifts from the outer side of the flange contour shape 62 onto the circumference of the flange contour shape 62 or the inner side of the flange contour shape 62, the region being located on an extension from one recess portion along the outer circumference of the flange contour shape 62 toward opposite portions (for example, protrusion portions) adjacent to the recess portion.

In this way, the vertex angle B1 is provided facing each of the first recess portion F1 and the second recess portion F2, and thus the vertex angle B1 is in close proximity to the first recess portion F1 and the second recess portion F2 in the direction orthogonal to the direction H, as viewed in the direction H from the opposite side of the direction H. Thus, while gripping the lower flange 56, the installing fingers of the stud pin installation device used in inserting the stud pin 50 into the pin inserting hole 29 comes into easier contact with the upper flange 58 of the stud pin 50 and easily assists the upper flange 58.

Figure 7:
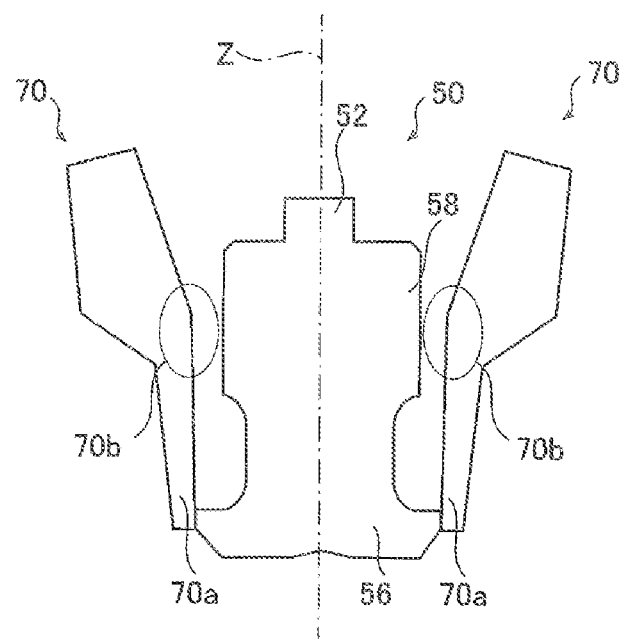
FIG. 7 is a diagram illustrating an example of gripping state of the stud pin of the present embodiment by installing fingers of a stud pin installation device.

FIG. 7 illustrates an example of gripping state of the stud pin 50 by the installing fingers of the stud pin installation device.

With installing fingers 70 gripping the lower flange 56 as illustrated in FIG. 7, a gap is formed between the installing fingers 70 and the body portion 54, and thus a center axis (an axis line extending through the centroid of the lower flange 56 or the body portion 54 and extending in the extension direction of the body portion 54) Z of the stud pin 50 may be inclined in the sheet of FIG. 7. Here, in a case where the stud pin 50 is significantly inclined to disturb the posture of the stud pin 50, the stud pins 50 is displaced from the target orientation (target orientation around the center axis Z) and may be prevented from being installed in the tire in the correct orientation.

In the present embodiment, the vertex angle B1 is provided facing each of the first recess portion F1 and the second recess portion F2, and the vertex angle B1 is in close proximity to the first recess portion F1 and the second recess portion F2, as described above. Thus, in a case where the stud pin 50 moves to incline, the upper flange 58 can come into contact with portions 70b (also referred to as pads of the installing fingers. The portions enclosed by ellipses in FIG. 7) of the installing fingers 70 located away from end portions 70a, and the installing fingers 70 can assist the upper flange 58 of the stud pin 50. Thus, the stud pin 50 is prevented from being significantly inclined to disturb the posture of the stud pin 50, and the posture of the stud pin 50 gripped by the installing fingers 70 can be stabilized. Thus, the stud pins 50 can be easily arranged in a target orientation and stud pins 50 can be installed in the correct orientation with respect to the tire. In other words, the easiness with which the stud pin 50 is implanted (pin implantation stability) is excellent.

As described above, according to the present embodiment, the stud pin 50 is less likely to fall out from the pin inserting hole 29, and braking and driving properties or controllability on the icy road surface are improved, and the stud pin 50 can be very easily implanted.

According to one embodiment, a first protrusion portion F3 is preferably provided for each of the short side portions interposed between the first recess portions F1 adjacent to each other, the first protrusion portion F3 projecting away from the centroid of the flange contour shape 62. A force from the road surface that acts to rotate the stud pin 50 around the center axis Z (a force having a component in a direction parallel to the longitudinal direction L) is particularly exerted during turning of the vehicle. According to the present embodiment, in the flange contour shape 62, the first protrusion portion F3 projecting in the direction along the longitudinal direction L offers resistance to the force that acts to rotate the stud pin 50 around the center axis Z, allowing rotation of the stud pin 50 to be suppressed. Additionally, the first protrusion portion F3 acts as an obstacle to the motion of the stud pin 50, inclined by a shear force from an icy road surface, falling out from the pin inserting hole 29. This leads to an increase in the force (holding force) of the tread rubber holding the stud pin 50 in the pin inserting hole 29. Thus, even in a case where the force acting to rotate the stud pin 50 around the center axis Z acts on the stud pin 50, the stud pin 50 is less likely to fall out from the pin inserting hole 29. In other words, pin drop resistance during turning of the vehicle is improved.

In the present embodiment, furthermore, according to one embodiment, in a portion of the body contour shape 64 between the vertex angles B1 adjacent to each other along the outer circumference of the body contour shape 64 (a portion extending linearly between the adjacent vertex angles B1 in FIG. 5), a distance L1 between the first protrusion portion F3 and a portion of the body contour shape 64 facing the first protrusion portion F3 along the direction orthogonal to a direction H (shortest distance) is preferably longer than a distance L2 between the second recess portion F2 and one of the vertex angles B1 facing the second recess portion F2 along the orthogonal direction (shortest distance). The first protrusion portions F3 projecting from the body portion 54 are provided such that L1 and L2 satisfy the above-described relationship, increasing the resistance of the tread rubber to the force acting to rotate the stud pin 50 around the center axis Z. This enhances the effect suppressing the rotation of the stud pin 50 and inhibits the stud pin 50, inclined by a shear force from an icy road surface, from the motion of falling out from the pin inserting hole 29, further increasing the force holding the stud pin 50 in the pin inserting hole 29. In other words, the pin drop resistance during turning of the vehicle is greatly increased. L1 is preferably twice to 15 times as large as L2 and more preferably five to 12 times as large as L2. According to an embodiment, in order to increase the pin drop resistance, the body contour shape 64 preferably includes linearly extending portions (linear portions) each between the vertex angles B1 adjacent to each other, that is, the vertex angles B1 and the linear portions are alternately disposed along the outer circumference of the body contour shape 64.

According to one embodiment, to improve the effect suppressing rotation of the stud pin 50, to inhibit the stud pin 50 from the motion of inclining and falling out from the pin inserting hole 29, and to further increase the holding force holding the stud pin 50 in the pin inserting hole 29, the first protrusion portion F3 preferably projects toward the center of one of the short sides 100a located on the same side as that on which the first protrusion portion F3 is located, with respect to the centroid G of the flange contour shape 62. This enhances the effect making the stud pin 50 less likely to fall out from the pin inserting hole 29 in a case where a force acting to rotate the stud pin 50 around the center axis Z is applied to the stud pin 50. "Center of the short side 100a" refers to the midpoint of the short side 100a.

With an excessively high ratio of the length of the long side of the smallest rectangle circumscribed by the flange contour shape 62 to the length of the short side of the smallest rectangle (aspect ratio), the installing fingers will be difficult to grip the lower flange 56, leading to the likelihood of mistakes in implantation of the stud pin 50. According to one embodiment, the aspect ratio of the lower flange 56 is preferably greater than 1 and equal to or smaller than 1.5, and more preferably from 1.05 to 1.25.

According to one embodiment, the curved shape of the first recess portion F1 and the curved shape of the second recess portion F2 are preferably arc shapes defined by the radius of curvature. In a case where the curved shape of the first recess portion F1 and the curved shape of the second recess portion F2 are formed by respective single radii of curvature, the radius of curvature of the first recess portion F1 is preferably 90 to 110% of the radius of curvature of the second recess portion F2 for stably gripping the stud pin 50 regardless of the type of the installing fingers.

According to one embodiment, as illustrated in FIG. 5, the flange contour shape 62 preferably further includes four second protrusion portions F4 each provided interposed between the first recess portion F1 and the second recess portion F2 adjacent to each other along the outer circumference of the flange contour shape 62, each of the second protrusion portions F4 projecting away from the centroid G of the flange contour shape 62. With such a configuration, the installing fingers of a stud pin installation device used in installing the stud pin 50 into the pin inserting hole 29 can more easily grip the lower flange 56 of the stud pin 50. For example, even in a case where the position of the lower flange 56 gripped by the installing fingers is displaced from the first recess portion F1 or the second recess portion F2, the installing fingers can slide along the contour of the second protrusion portion F4 and are guided to the first recess portion F1 or the second recess portion F2, allowing the stud pin 50 to be stably gripped. In addition, the two second protrusion portions F4 disposed for each of the long side portions inhibit the stud pin 50, subjected to a shear force from an icy road surface, from the motion of inclining and falling out from the pin inserting hole 29. This increases the force holding the stud pin 50 in the pin inserting hole 29 to make the stud pin 50 less likely to fall out from the pin inserting hole 29. Thus, the braking and driving properties during straight driving are favorable.

According to one embodiment, preferably, the first recess portion F1 has a first arc shape, and portions (for example, respective portions of the first protrusion portion F3 and the second protrusion portion F4 closer to the first recess portion F1) of the flange contour shape 62 located on both sides of the first recess portion F1 along the outer circumference of the flange contour shape 62 and connected to the first recess portion F1 each have a second arc shape curved away from the centroid of the flange contour shape 62. In this case, the arc of the first arc shape preferably has a greater radius of curvature than the arc of the second arc shape. Thus, the portions of the first protrusion portion F3 and the second protrusion portion F4 connected to the first recess portion F1 are more significantly inclined with respect to the circumferential direction of the stud pin 50, and even in a case where the installing fingers grip the first protrusion portion F3 or the second protrusion portion F4, the installing fingers can be slid and guided into the first recess portion F1. In this embodiment, both ends of the arc of the first arc shape are connected to the arc of the second arc shape. Additionally, in this embodiment, the radii of curvature of the arcs of the second arc shapes on both sides of the first recess portion F1 may be equal to or different from each other.

According to one embodiment, the recess portions and protrusion portions included in the flange contour shape 62, that is, the first recess portions F1, the second recess portions F2, the first protrusion portions F3, and the second protrusion portions F4 are preferably located at respective vertex angles of a concave polygon. In the example illustrated in FIG. 5, the recess portions and the protrusion portions included in the flange contour shape 62 are located at respective vertex angles of a concave dodecagon.

According to one embodiment, as illustrated in FIG. 5, at least either the first recess portions F1 or the second recess portions F2 preferably satisfy at least one of forming a line symmetrical shape about a first imaginary straight line AL1 that is parallel to the lateral direction S and that extends through the centroid G or forming a line symmetrical shape about a second imaginary straight line AL2 that is parallel to the longitudinal direction L and that extends through the centroid G. In this way, in a case where the stud pin 50 is inserted into the pin inserting hole 29, the installing fingers can easily grip the stud pin 50 in alignment with the target orientation.

According to one embodiment, as illustrated in FIG. 5, at least either the first protrusion portions F3 or the second protrusion portions F4 preferably satisfy at least one of forming a line symmetrical shape about the first imaginary straight line AL1 that is parallel to the lateral direction S and that extends through the centroid G or forming a line symmetrical shape about the second imaginary straight line AL2 that is parallel to the longitudinal direction L and that extends through the centroid G. In this way, in a case where the stud pin 50 is inserted into the pin inserting hole 29, the installing fingers can easily grip the stud pin 50 in alignment with the target orientation.

According to one embodiment, the first recess portion F1 preferably extends along the direction inclined with respect to the lateral direction S, as in the example illustrated in FIG. 5. The first recess portion F1 extending along the direction inclined with respect to the lateral direction S means that a virtual straight line connecting both ends of the first recess portion F1 on the outer circumference of the flange contour shape 62 is inclined with respect to the lateral direction S. Both ends of the first recess portion F1 are also both ends of the region on the outer circumference of the flange contour shape 62 in which the first recess portion F1 is located as described above. In a case where the first recess portion F1 extending along the direction inclined with respect to the lateral direction S causes the stud pin 50 to be subjected to a force having components in both the longitudinal direction L and the lateral direction S of the flange contour shape 62, the force is efficiently transmitted by fastening of opposite portions across the first recess portion F1 (for example, the first protrusion portion F3 and the second protrusion portion F4) by the inner wall surface of the pin inserting hole 29, improving the braking and driving properties or controllability on the icy road surface.

Figure 8:
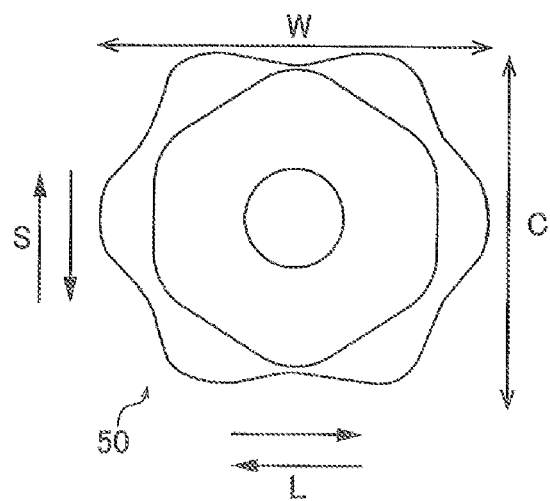
FIG. 8 is a diagram illustrating the orientation of the stud pin installed in the tire.

In this manner, the stud pin 50 including the flange contour shape 62 and the body contour shape 64 with an anisotropic shape is installed in a tire. FIG. 8 is a diagram illustrating the orientation of the stud pin 50 installed in the tire.

FIG. 8 illustrates an example in which the stud pin is installed in the pin inserting hole 29 with arrangement directions set such that the longitudinal direction L of the lower flange 56 faces the tire width direction W and that the lateral direction S faces the tire circumferential direction C. Here, "the longitudinal direction L of the lower flange 56 facing the tire width direction W" refers to the longitudinal direction L of the lower flange 56 being inclined within a predetermined angular range (for example, at 15 degrees of less) with respect to the tire width direction W.

As illustrated in FIG. 8, in a case where the stud pin 50 is disposed with the longitudinal direction L corresponding to the tire width direction W, the stud pin 50 receiving a lateral force as sheer force acts to incline in such a manner as to tumble within the pin inserting hole 29. However, as described above, the tread rubber 18 deformed in association with the recesses and protrusions formed by the six recess portions F1 and F2 of the lower flange 56 and the polygonal shape of the body portion 54 firmly fastens the lower flange 56 and the body portion 54 by the inner wall surface of the pin inserting hole 29, hindering formation of a gap between the stud pin 50 and the pin inserting hole 29 due to inclining of the stud pin 50 in the tire width direction W. Thus, the stud pin 50 does not easily rotate within the pin inserting hole 29. Thus, the stud pin 50 is less likely to fall out from the pin inserting hole 29, and the lateral force is efficiently transferred from the stud pin 50 through the tread rubber 18 to the belt 14, improving the braking and driving properties and controllability on the icy road surface. Additionally, as described above, in a case where the first recess portion F1 faces the direction inclined with respect to the lateral direction S (tire circumferential direction C), even when braking and driving are added during turning of the tire to incline the orientation of the lateral force received by the stud pin 50, the lateral force is efficiently transferred from the stud pin 50 through the tread rubber 18 to the belt 14 by fastening of opposite portions across the first recess portion F1 (for example, the first protrusion portion F3 and the second protrusion portion F4) by the inner wall surface of the pin inserting hole 29, improving the braking and driving properties or controllability on the icy road surface. Additionally, in a case where the stud pin 50 is inserted in the pin inserting hole 29 with the longitudinal direction L of the lower flange 56 facing the tire width direction W, the flange contour shape 62 has an anisotropic shape, and for the short side portion, the portion between the first recess portions F1 adjacent to each other (for example, the first protrusion portion F3) is disposed facing the longitudinal direction. And thus, during traveling with a slip angle, for example, during turning of the vehicle, as described above, the stud pin 50, subjected to a shear force from an icy road surface, is inhibited from the motion of inclining and falling out from the pin inserting hole 29, and the force holding the stud pin 50 in the pin inserting hole 29 is increased to make the stud pin 50 less likely to fall out from the pin inserting hole 29 in a case where the lateral force generated during turning of the vehicle acts on the stud pin 50. Furthermore, the flange contour shape 62 includes the two second protrusion portions F4 facing the tire circumferential direction C, inhibiting the stud pin 50 from the motion of inclining and falling out from the pin inserting hole 29 even in a case where the stud pin 50 receives a strong breaking or accelerating force during braking or driving, and the force holding the stud pin 50 in the pin inserting hole 29 is increased. Thus, braking and driving properties on the icy road surface are improved, and the pin drop resistance during braking and driving is also increased.

Examples, Conventional Example, and Comparative Examples

Stud pins including lower flanges and body portions with different contour shapes were manufactured. The manufactured stud pins were inserted in tires 10 with the configuration illustrated in FIGS. 1 to 3 to manufacture studded tires. The studded tires were mounted to a passenger vehicle used as a test vehicle, and the stud pins were evaluated. The form of the stud pins is based on the form illustrated in FIGS. 4 and 5, except for Tables 1 and 2 and the points described below.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on the front wheels and a 300 kg load on the rear wheels. The evaluation items for the stud pins are as follows.

Pin Implantation Stability

Stud pins were gripped by installing fingers of a stud pin installation device and installed in a tire. The proportion of stud pins correctly installed in the pin inserting holes 29 was found. For Comparative Examples and Examples 1 and 2, the installation of the stud pins is targeted such that the longitudinal direction of the lower flange facing the tire width direction. For Examples 3, the installation of the stud pins is targeted such that the longitudinal direction of the lower flange faces the tire circumferential direction. The number of times the stud pins are inserted into the pin inserting holes 29 tilted with respect to the pin inserting holes 29 (inclined, during insertion, at an angle beyond the predetermined angular range described above), and the number of times the stud pin has failed to be inserted into the pin inserting hole 29 are taken as the number of failures. The proportion (%) of the number of failures to the total number of stud pins installed in the tire is subtracted from 100%, and the resultant value is determined to be pin implantation stability. A pin implantation stability (%) of 95% or greater indicates excellent pin implantation stability.

Pin Drop Resistance

The proportion (%) of the number of stud pins remaining in the tread rubber to the total number of installed stud pins is obtained after a test vehicle travels 15000 km on a course including dry road surfaces including asphalt road surfaces or concrete road surfaces, the course including turning test roads. A proportion of 95% or greater is evaluated as there being no practical problem with regard to pin drop.

Braking Ability on Ice

The test vehicle is driven on an icy road surface, and the travel distance taken upon engaging braking for the test vehicle to go from a speed of 30 km/h to 5 km/h is measured as the braking distance. The reciprocal of the braking distance of the Conventional Example is assigned as a reference (index value of 100) and the reciprocals of the braking distances of the Examples are expressed as index values. Larger index values indicate shorter braking distance and superior braking ability on ice.

Controllability on Ice

Two evaluator drivers drove the test vehicle on an icy road surface of a conditioned closed course and performed a subjective evaluation of controllability. The scores of the two evaluator drivers were averaged and expressed as index values with the score of the Conventional Example being assigned as the reference (index value of 100). Larger index values indicate superior controllability on ice.

Tables 1 and 2 indicates the various specifications and evaluation results of the Conventional Example, Comparative Examples, and Examples.

"Shape of first and second smallest rectangle circumscribing flange contour shape" in Tables 1 and 2 refers to the shape of either the first or second smallest rectangle illustrated in FIG. 4B. However, "circular shape" in Conventional Example refers to the contour shape of the lower flange itself instead of the shape of the first or second smallest rectangle. In Comparative Examples and Examples, the ratio of length of long side of "rectangle" to length of short side of "rectangle" (aspect ratio) is 1:1.6 in Example 5 and 1:1.13 in the other examples.

For the "number of recess portions" described in Tables 1 and 2 (first recess portions F1 and second recess portions F2)," "4" means that a total of four first recess portions F1 are provided, including two for each short side portion, and "2" means that a total of two second recess portions F2 are provided, including one for each long side portion.

For the "relationship between vertex angle B1 and recess portion" described in Tables 1 and 2, "not facing" means that the vertex angle B1 faces the protrusion portion located between the recess portions adjacent to each other along the outer circumference of the flange contour shape (the orientation direction viewed from the centroid is the same), and "facing" means that the vertex angle B1 faces the recess portion of the flange contour shape, as illustrated in FIG. 4B. Note that, in Comparative Example 2, each of the four vertex angles of the body portion faces the first recess portion F1.

For the "magnitude relationship between L1 and L2" described in Tables 1 and 2, the ratio of L1 to L2 in "L1<L2" is 1:2, and the ratio of L1 to L2 in "L1>L2" is 6:1.

For the "magnitude relationship between R1 and R2" described in Tables 1 and 2, "R1" means the radius of curvature of the first arc shape of the first recess portion F1, and "R2" indicates the radius of curvature of the second arc shape corresponding to the portion of each of the first and second protrusion portions F3 and F4 that is closer to the first recess portion F1.

In "body contour shape" in Tables 1 and 2, "circular shape" means that the body contour shape as viewed in the direction H from the opposite side of the direction H is circular, and "hexagonal shape" means that the body contour shape is the body contour shape 64 illustrated in FIG. 4B.

TABLE 1

|  | Conventional Example | Comparative Example 1 | Comparative Example 2 | Example 1 | Example 2 |
|---|---|---|---|---|---|
| Shapes of first and second smallest rectangle circumscribing contour shape | Circular shape | Rectangle | Rectangle | Rectangle | Rectangle |
| Aspect ratio of flange contour shape | — | 1:1.13 | 1:1.13 | 1:1.13 | 1:1.13 |
| Number of recess portions (first recess portions F1 and second recess portions F2) | — | 4, 2 | 4, 2 | 4, 2 | 6, 2 |
| Magnitude relationship between L1 and L2 | — | L1 < L2 | L1 < L2 | L1 < L2 | L1 < L2 |
| Magnitude relationship between R1 and R2 | — | R1 > R2 | R1 > R2 | R1 > R2 | R1 > R2 |
| Body contour shape | Circular shape | Hexagonal shape | Quadrilateral shape | Hexagonal shape | Octagonal shape |
| Relationship between vertex angle B1 and recess portion | — | Not facing | Facing | Facing | Facing |
| Orientation of longitudinal direction | — | Width direction | Width direction | Width direction | Width direction |
| Pin implantation stability [%] | 30 | 93 | 94 | 98 | 99 |
| Pin drop resistance | 55 | 96 | 96 | 96 | 95 |
| Braking ability on ice | 100 | 104 | 104 | 104 | 104 |
| Controllability on ice | 100 | 106 | 106 | 106 | 107 |

TABLE 2

|  | Example 3 | Example 4 | Example 5 | Example 6 |
|---|---|---|---|---|
| Shapes of first and second smallest rectangle circumscribing contour shape | Rectangle | Rectangle | Rectangle | Rectangle |
| Aspect ratio of flange contour shape | 1:1.13 | 1:1.13 | 1:1.6 | 1:1.13 |
| Number of recess portions (first recess portions F1 and second recess portions F2) | 4, 2 | 4, 2 | 4, 2 | 4, 2 |
| Magnitude relationship between L1 and L2 | L1 < L2 | L1 > L2 | L1 > L2 | L1 > L2 |
| Magnitude relationship between R1 and R2 | R1 = R2 | R1 > R2 | R1 > R2 | R1 > R2 |
| Body contour shape | Hexagonal shape | Hexagonal shape | Hexagonal shape | Hexagonal shape |
| Relationship between vertex angle B1 and recess portion | Facing | Facing | Facing | Facing |
| Orientation of longitudinal direction | Width direction | Width direction | Width direction | Circumferential direction |
| Pin implantation stability [%] | 97 | 98 | 96 | 98 |
| Pin drop resistance | 96 | 99 | 99 | 95 |
| Braking ability on ice | 104 | 105 | 105 | 107 |
| Controllability on ice | 106 | 108 | 108 | 104 |

A comparison between Conventional Example and Comparative Example 1 and Example 1 indicates that the pin implantation stability is improved by providing the vertex angles B1 and the recess portions with each vertex angle B1 facing the corresponding recess portion.

A comparison between Comparative Example 2 and Example 1 indicates that the pin implantation stability is improved in a case where the vertex angles B1 are identical in number to the recess portions.

A comparison between Example 1 and Example 3 indicates that pin implantation stability is improved by satisfying R1>R2.

A comparison between Example 1 and Example 4 indicates that by satisfying L1>L2, the pin drop resistance is improved, and the braking ability on ice and the controllability on ice are improved.

A comparison between Example 4 and Example 5 indicates that the pin implantation stability is improved in a case where the aspect ratio of the flange contour shape is greater than 1 and equal to or smaller than 1.5.

A comparison between Example 4 and Example 6 indicates that the pin drop resistance and the controllability on ice are improved by disposing the stud pin with the longitudinal direction of the stud pin aligned with the tire width direction.

A stud pin and a studded tire according to an embodiment of the present technology have been described above. However, it should be understood that the present technology is not limited to the above embodiments and examples, and may be improved or modified in various ways so long as these improvements or modifications remain within the scope of the present technology.

The invention claimed is:

1. A stud pin installable in a tire, comprising:
a tip comprising an end surface that comes into contact with a road surface;
a body portion holding the tip with the tip projecting from an end portion of one side of the body portion; and
a lower flange connected to an end portion of the other side of the body portion opposite to the end portion of the one side of the body portion, wherein
a flange contour shape of the lower flange as viewed in an arrangement direction of the tip, the body portion, and the lower flange has an anisotropic shape in which, among imaginary rectangles circumscribing the flange contour shape, at least one smallest rectangle of a first smallest rectangle having a shortest side of four sides being smallest among the rectangles or a second smallest rectangle having a longest side of four sides being smallest among the rectangles comprises short sides and long sides having different lengths, the flange contour shape comprises two or more first recess portions provided on each of portions of the flange contour shape extending along the short sides, the first recess portions being curved toward a centroid of the flange contour shape, the flange contour shape comprises a second recess portion provided on each of portions of the flange contour shape extending along the long sides, the second recess portion being curved toward the centroid of the flange contour shape, a body contour shape of the body portion as viewed in the arrangement direction is a polygonal shape comprising a plurality of vertex angles, a number of the vertex angles is identical to a total number of the first recess portions and the second recess portions, the vertex angles are disposed respectively facing the first recess portions and the second recess portions, and a shortest distance L1 between a maximum protruding point of a first protrusion portion of the lower flange between two of the two or more first recess portions and a portion of the body contour shape facing the first protrusion portion is less than a shortest distance L2 between a maximum recessed point of the second recess portion on one of the long sides and one of the vertex angles facing the second recess portion along the orthogonal direction.

2. The stud pin according to claim 1, wherein the first protrusion portion projects toward a center of one of two of the short sides of the at least one of the smallest rectangles, the short side being located on a same side as that on which the first protrusion portion is located, with respect to the centroid of the flange contour shape.

3. The stud pin according to claim 2, wherein a ratio of a length of the long side of the smallest rectangle circumscribing the flange contour shape to a length of the short side of the smallest rectangle is greater than 1 and equal to or smaller than 1.5.

4. The stud pin according to claim 3, wherein the first recess portion has a first arc shape, portions of the flange contour shape located on both sides of the first recess portion along the outer circumference of the flange contour shape and connected to the first recess portion each have a second arc shape curved away from the centroid of the flange contour shape, and the arc of the first arc shape has a greater radius of curvature than the arc of the second arc shape.

5. A studded tire installed with stud pins, the studded tire comprising:

a tread portion installed with the stud pins according to claim 4 such that a longitudinal direction of the flange contour shape parallel to the long sides faces a tire width direction.

6. The stud pin according to claim 1, wherein a ratio of a length of the long side of the smallest rectangle circumscribing the flange contour shape to a length of the short side of the smallest rectangle is greater than 1 and equal to or smaller than 1.5.

7. The stud pin according to claim 1, wherein the first recess portion has a first arc shape, portions of the flange contour shape located on both sides of the first recess portion along an outer circumference of the flange contour shape and connected to the first recess portion each have a second arc shape curved away from the centroid of the flange contour shape, and the arc of the first arc shape has a greater radius of curvature than the arc of the second arc shape.

8. A studded tire installed with stud pins, the studded tire comprising:

a tread portion installed with the stud pins according to claim 1 such that a longitudinal direction of the flange contour shape parallel to the long sides faces a tire width direction.

9. The stud pin according to claim 1, wherein a depth of each of the first recess portions is less than or equal to a depth of the second recess portion.

10. The stud pin according to claim 1, wherein a ratio of a length of the long side of the smallest rectangle circumscribing the flange contour shape to a length of the short side of the smallest rectangle is greater than 1.25 and equal to or smaller than 1.5.

11. The stud pin according to claim 1, wherein a radius of curvature of the first recess portions is 90 to 110% of a radius of curvature of the second recess portion.

12. The stud pin according to claim 1, wherein radii of curvature of arcs of second arc shapes on either side of the first recess portions are equal to each other.

13. A stud pin installable in a tire, comprising:

a tip comprising an end surface that comes into contact with a road surface;

a body portion holding the tip with the tip projecting from an end portion of one side of the body portion; and a lower flange connected to an end portion of the other side of the body portion opposite to the end portion of the one side of the body portion, wherein a flange contour shape of the lower flange as viewed in an arrangement direction of the tip, the body portion, and the lower flange has an anisotropic shape in which, among imaginary rectangles circumscribing the flange contour shape, at least one smallest rectangle of a first smallest rectangle having a shortest side of four sides being smallest among the rectangles or a second smallest rectangle having a longest side of four sides being smallest among the rectangles comprises short sides and long sides having different lengths, the flange contour shape comprises at least three first recess portions provided on each of portions of the flange contour shape extending along the short sides, the first recess portions being curved toward a centroid of the flange contour shape, the flange contour shape comprises a second recess portion provided on each of portions of the flange contour shape extending along the long sides, the second recess portion being curved toward the centroid of the flange contour shape, a body contour shape of the body portion as viewed in the arrangement direction is a polygonal shape comprising a plurality of vertex angles, a number of the vertex angles is identical to a total number of the first recess portions and the second recess portions, and the vertex angles are disposed respectively facing the first recess portions and the second recess portions.

\* \* \* \* \*